United States Patent [19]

Kobayashi et al.

[11] Patent Number: 5,609,662

[45] Date of Patent: Mar. 11, 1997

[54] METHOD FOR PROCESSING NITER-CONTAINING GLASSMAKING MATERIALS

[75] Inventors: Hisashi Kobayashi, Putnam Valley; Maynard G. Ding, Yorktown Heights; Arthur W. Francis, Jr., Monroe, all of N.Y.

[73] Assignee: Praxair Technology, Inc., Danbury, Conn.

[21] Appl. No.: 432,444

[22] Filed: May 1, 1995

Related U.S. Application Data

[63] Continuation of Ser. No. 118,346, Sep. 9, 1993, abandoned.

[51] Int. Cl.$^6$ .................................................. C03B 5/20
[52] U.S. Cl. ................. 65/135.1; 65/134.1; 65/134.4; 65/134.6; 65/347; 431/10
[58] Field of Search ............... 65/32.5, 27, 134.1–134.9, 65/135.1–135.9, 136.1–136.4, 347; 431/10

[56] References Cited

U.S. PATENT DOCUMENTS

| | | | |
|---|---|---|---|
| 3,873,671 | 3/1975 | Reed et al. | 423/235 |
| 4,061,487 | 12/1977 | Kiyonaga | 65/135 |
| 4,185,984 | 1/1980 | Kiyonaga | 65/135 |
| 4,473,388 | 9/1984 | Lauwers | 65/134 |
| 4,617,042 | 10/1986 | Stickler | 65/27 |
| 4,617,046 | 10/1986 | Hals | 65/134 |
| 4,631,080 | 12/1986 | Westra et al. | 65/134 |
| 4,725,299 | 2/1988 | Khinkis et al. | 65/134 |
| 4,761,132 | 8/1988 | Khinkis | 431/10 |
| 4,878,830 | 11/1989 | Henderson | 431/10 |
| 4,882,736 | 11/1989 | Pieper | 65/134 |
| 4,944,785 | 7/1990 | Sorg et al. | 65/136 |
| 4,973,346 | 11/1990 | Kobayashi | 65/135 |
| 5,085,156 | 2/1992 | Dykema | 431/10 |
| 5,147,438 | 9/1992 | Castelain et al. | 65/135 |
| 5,186,617 | 2/1993 | Ho | 431/9 |
| 5,209,656 | 5/1993 | Kobayashi et al. | 431/187 |
| 5,387,100 | 2/1995 | Kobayashi | 431/10 |
| 5,447,547 | 9/1995 | Goldfarb et al. | 65/134.4 |

Primary Examiner—Donald E. Czaja
Assistant Examiner—Michael Philip Colaianni
Attorney, Agent, or Firm—Stanley Ktorides

[57] ABSTRACT

A glassmelting method employing reducing and oxidizing conditions generated by defined combustion arrangements enabling the processing of glassmaking materials while reducing NOx emissions which would otherwise result from, for example, niter decomposition. The NOx is reduced to nitrogen under the reducing conditions and kept from reforming in the oxidizing zone.

5 Claims, 1 Drawing Sheet

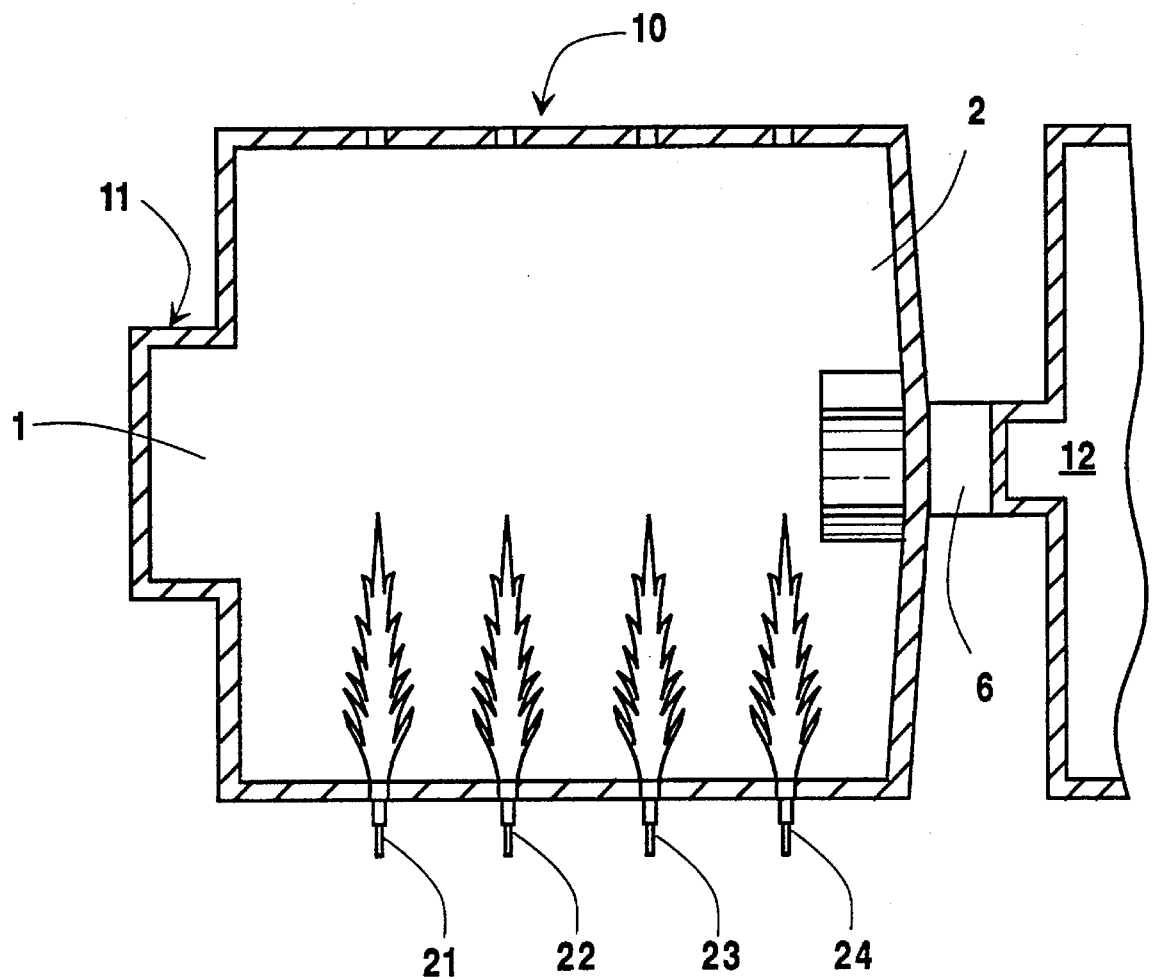
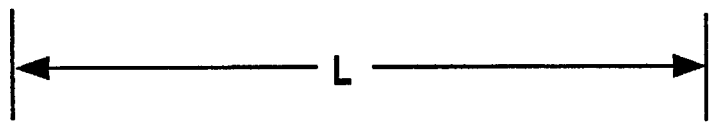

METHOD FOR PROCESSING NITER-CONTAINING GLASSMAKING MATERIALS

This application is a continuation of prior U.S. application Ser. No. 08/118,346, filing date Sep. 9, 1993, abandoned.

TECHNICAL FIELD

This invention relates generally to glassmaking and more particularly to the processing of glassmaking materials such as in a glassmelting furnace.

BACKGROUND ART

In the making of glass a very large amount of heat is needed to melt the glassmaking materials as they are processed in a glassmelting furnace. Generally this heat is provided by the combustion of fuel and oxidant which has heretofore generally been air.

Nitrogen oxides (NOx) are recognized pollutants and it is desirable to reduce emissions of NOx from industrial processes. NOx is produced in air-based combustion mainly because at the high temperatures of the combustion reaction, nitrogen from the air combines with oxygen.

Recently in response to the NOx problem many industrial processes have begun using pure oxygen or oxygen-enriched air to carry out the combustion as this reduces or completely eliminates the nitrogen brought into the area of the combustion reaction by the oxidant.

In the processing of glassmaking materials such as in a glassmaking furnace, while the use of oxygen or oxygen-enriched air has indeed served to reduce the NOx emissions over what would have been expected if air were the oxidant, the reduction in NOx generation has not been as great as should be expected when the batch materials contained niter.

Accordingly, it is an object of this invention to provide a method for processing glassmaking materials with reduced emissions of nitrogen oxides.

SUMMARY OF THE INVENTION

Applicants believe that the problem of higher than expected NOx generation in the processing of glassmaking materials results primarily from the use of niter as an oxidizer in the glassmaking materials wherein the niter decomposes to form NOx.

Accordingly, it is a further object of the invention to provide a method for processing niter-containing glassmaking materials to achieve reduced levels of nitrogen oxides emissions.

The above and other objects which will become apparent to one skilled in the art upon a reading of this disclosure are attained by:

A method for processing glassmaking materials with reduced emissions of nitrogen oxides comprising:

(A) providing a glassmelting furnace having a charge zone and a discharge zone;

(B) providing glassmaking materials including niter into said charge zone and decomposing niter therein to form nitrogen oxides;

(C) providing fuel and oxygen in a fuel-rich ratio into said charge zone, combusting them therein to form combustion reaction products including products of incomplete combustion, and reducing nitrogen oxides in the charge zone to form nitrogen; and (D) passing the glassmaking materials into the discharge zone, providing fuel and oxygen in an oxygen-rich ratio into said discharge zone and combusting them therein, and reacting products of incomplete combustion with oxygen to form products of complete combustion.

As used herein the terms "nitrogen oxides" and "NOx" mean one or more of nitrous oxide ($N_2O$), nitric oxide (NO), nitrogen trioxide ($N_2O_3$), dinitrogen tetroxide ($N_2O_4$), nitrogen dioxide ($NO_2$), trinitrogen tetroxide ($N_3O_4$) and nitrogen trioxide ($NO_3$).

As used herein the term "niter" means one or more nitrate compounds such as sodium nitrate ($NANO_3$) and potassium nitrate ($KNO_3$).

As used herein the term "products of complete combustion" means one or more of carbon dioxide and water vapor.

As used herein the term "products of incomplete combustion" means one or more of carbon monoxide, hydrogen, carbon and partially combusted hydrocarbons.

As used herein the term "unburned fuel" means fuel which has undergone no combustion and/or products of incomplete combustion.

BRIEF DESCRIPTION OF THE DRAWING

The sole figure is a simplified plan view representation of one embodiment of a glassmelting furnace wherein the method of this invention may be practiced.

DETAILED DESCRIPTION

In the practice of this invention there is established within a glassmelting furnace an upstream zone, wherein NOx is reduced above the glass surface while more oxidizing conditions are maintained near the glass surface, and a downstream oxidizing zone. The defined upstream zone conditions serve to reduce NOx, such as NOx generated from niter, to nitrogen. Within the oxidizing zone the combustion is completed to increase the amount of heat generated to carry out the melting and to reduce the level of products of incomplete combustion passed out of the furnace, but without regenerating high levels of NOx.

The method of this invention will be discussed in greater detail with reference to the drawing. Referring now to the figure, there is provided glassmelting furnace 10 having an upstream charge zone 1 and a downstream discharge zone 2. For purposes of general description, the charge zone may be described as extending from the input end through from 15 to 50 percent of the axial length L of the furnace with the discharge zone comprising substantially the remainder of the axial length L of the furnace.

Glassmaking materials are passed into charge zone 1 through feeder 11, through the length of furnace 10 and out through conduit 6 into refining zone 12 for further processing. The glassmaking materials are melted as they make this passage through furnace 10 by heat generated by means of burners 21, 22, 23 and 24. The glassmaking materials may include one or more of sand, soda ash, limestone, dolomite, rouge and cullet or scrap glass. The glassmaking materials may also include niter. When niter is present in the glassmaking materials, the heat within the furnace causes niter to decompose and to form NOx within the charge zone.

Fuel and oxygen are provided in a fuel-rich ratio into the charge zone. Examples of suitable fuels which may be used in the practice of the method of this invention include methane, natural gas, oil and hydrogen. The oxygen may be provided in the form of air, or a fluid having an oxygen concentration which exceeds that of air. Preferably the oxygen is provided in the form of a fluid having an oxygen concentration of at least 80 mole percent, most preferably at least 90 mole percent. The oxygen may, if desired, be provided in the form of commercially pure oxygen.

As mentioned the fuel and oxygen are provided into the charge zone in a fuel-rich ratio. It is believed that preferably this ratio of fuel and oxygen is within the range of from 50 to 95 percent of stoichiometric. The fuel and oxygen are combusted within the charge zone to form combustion reaction products including products of incomplete combustion owing to the substoichiometric nature of the fuel to oxygen ratio.

Nitrogen oxides which are in the charge zone, such as from the decomposition of niter, are reduced to nitrogen by a reaction sequence with unburned fuel, such as fuel radicals, resulting from the substoichiometric combustion. For example hydrocarbon radicals react with NO to form HCN, which then reacts with other radicals to form NH, which then reacts with other radicals and NO to form nitrogen. In a preferred embodiment the fuel and/or oxygen are provided into the charge zone at a high velocity within the range of from 30 to 1500 feet per second (fps), preferably within the range of from 100 to 1000 fps, and the resulting high velocity combustion reaction entrains furnace atmosphere including NOx to facilitate the aforedescribed-reduction of NOx to nitrogen.

The resulting combustion reaction products and glassmaking materials are passed from the charge zone into the discharge zone. Fuel and oxygen are provided into the discharge zone in an oxygen-rich ratio. The fuel may be the same or different from that provided into the charge zone and may be methane, natural gas, oil or hydrogen. The oxygen may be provided in the same or in a different form from that provided into the charge zone. Preferably the oxygen is provided into the discharge zone in the form of a fluid having an oxygen concentration of at least 80 mole percent, most preferably at least 90 mole percent. If desired, the oxygen may be in the form of commercially pure oxygen.

The oxygen-rich or superstoichiometric ratio of the combustion reactants provided into the discharge zone is preferably within the range of from 102 to 120 percent of stoichiometric. The fuel and oxygen provided into the discharge zone combust therein and, owing to the excess oxygen provided to combust this fuel, the fuel is essentially completely combusted. Moreover, the excess oxygen reacts with the products of incomplete combustion passed into the discharge zone from the charge zone to form products of complete combustion thus serving to generate even more heat to melt the glassmaking materials and to reduce deleterious emissions from the furnace.

The excess oxygen available in the discharge zone does not significantly react with nitrogen to form NOx because the flame temperature of the products of incomplete combustion and the oxygen is low. This scavenging effect is enhanced if there is good mixing within the atmosphere of the discharge zone. Such good mixing may be achieved by high velocity injection of the fuel and/or oxygen into the discharge zone. Preferably this high velocity is within the range of from 30 to 1500 fps, most preferably within the range of from 100 to 1000 fps.

The molten glassmaking materials are passed out of the furnace from the discharge zone through passage 6 for further processing. The resulting gases in the furnace atmosphere may be passed out of the furnace from either the discharge or the charge zone. When the gases are passed out from the charge zone, the reaction of products of incomplete combustion with excess oxygen occurs in the charge zone; when the gases are passed out from the furnace from the discharge zone, the reaction of products of incomplete combustion with excess oxygen occurs in the discharge zone.

In a particularly preferred embodiment of the method of this invention the fuel and oxygen are provided into the furnace and combusted therein using the segregated zoning combustion method disclosed and claimed in U.S. Pat. No. 5,076,779—Kobayashi and using the high velocity gas injection system disclosed and claimed in U.S. Pat. No. 5,209,656—Kobayashi et al.

The following example and comparative example are presented to further illustrate the invention and its advantages without implying any limitation to the claimed invention.

A four-port glassmelting furnace was operated using natural gas and air at a rate to produce 200 tons per day of molten glassmaking material. The feed into the furnace included 308 lb/hr. of niter ($KNO_3$). The NOx emissions from the furnace was 230 lb/hr.

Air fired ports No. 1 and No. 2 were shut down and three oxy-fuel burners were positioned in locations similar to those of burners 21, 22 and 23 shown in the figure. Specifically the first burner was placed between the end wall and the first port, the second burner was placed between the first and second ports, and the third burner was placed between the second and third ports. Three other burners were similarly placed on the opposite sidewall of the furnace. Each burner comprised a fuel lance and an oxygen lance separated by 12 inches and directed to prevent direct mixing of the fuel and oxygen until they had a chance to first entrain and mix with furnace gases. The burners each employed natural gas as the fuel and commercially pure oxygen as the oxidant.

The first burners provided fuel and oxygen into the charge zone of the furnace firing under fuel-rich conditions of 4000 standard cubic feet per hour (scfh) of natural gas and 4400 scfh of commercially pure oxygen. This ratio was 55 percent of stoichiometric. However, because of air inleakage the actual ratio was higher. The second and third burners also used natural gas and commercially pure oxygen and were each fired at 7250 scfh of natural gas and 13050 scfh of oxygen to provide oxygen and fuel into the discharge zone which when combined with air inleakage exceeded 100 percent. A glassmelting procedure similar to that described above with the air firing was carried out and the NOx emissions were only at between 70 to 100 lb/hr.

While the present invention will find its greatest utility in cases where the glassmaking materials contain niter, the invention may also be used effectively in other glassmaking processes when NOx is generated in either the charge or discharge zone such as from high NOx burners or from oil flames which result from the combustion of oil which contains nitrogen such as in the form of one or more nitrogen compounds. Such a process may be described as:

A method for processing glassmaking materials with reduced emissions of nitrogen oxides comprising:

(A) providing a glassmelting furnace having a charge zone and a discharge zone;

(B) providing glassmaking materials into said charge zone and providing nitrogen oxides therein;

(C) providing fuel and oxygen in a fuel-rich ratio into said charge zone, combusting them therein to form combustion reaction products including products of incomplete combustion, and reducing nitrogen oxides in the charge zone to form nitrogen; and (D) passing the glassmaking materials into the discharge zone, providing fuel and oxygen in an oxygen-rich ratio into said discharge zone and combusting them therein, and reacting products of incomplete combustion with oxygen to form products of complete combustion.

Now, by the use of this invention, one can process glassmaking materials, including glassmaking materials which include niter, while achieving reduced NOx emissions. Although the invention has been described in detail with reference to certain preferred embodiments, those skilled in the art will recognize that there are other embodiments of the invention within the spirit and scope of the claims.

We claim:

1. A method for processing glassmaking materials in a glassmelting furnace having a charge zone and a discharge zone with reduced emissions of nitrogen oxides comprising:

(A) introducing glassmaking materials including nitrate into said charge zone and decomposing nitrate therein to form nitrogen oxides;

(B) introducing fuel and oxygen in a fuel-rich ratio into said charge zone, combusting them therein to form combustion reaction products including products of incomplete combustion, and reducing nitrogen oxides in the charge zone to form nitrogen; and (C) passing the glassmaking materials, products of incomplete combustion and nitrogen into the discharge zone, introducing fuel and oxygen in an oxygen-rich ratio into said discharge zone and combusting them therein, reacting the products of incomplete combustion with oxygen to form products of complete combustion, and passing the products of complete combustion out from the glassmelting furnace from the discharge zone.

2. The method of claim 1 wherein the said fuel-rich ratio is within the range of from 50 to 95 percent of stoichiometric.

3. The method of claim 1 wherein the said oxygen-rich ratio is within the range of from 102 to 120 percent of stoichiometric.

4. The method of claim 1 wherein at least one of the fuel and oxygen is provided into the charge zone at a high velocity within the range of from 100 to 1000 feet per second to form a high velocity combustion reaction and entraining NOx into the high velocity combustion reaction to facilitate the reduction of NOx to nitrogen.

5. The method of claim 1 wherein at least one of the fuel and oxygen is provided into the discharge zone at a high velocity within the range of from 100 to 1000 feet per second.

\* \* \* \* \*